United States Patent [19]

McAllister

[11] Patent Number: 5,011,729

[45] Date of Patent: Apr. 30, 1991

[54] VACUUM INSULATED PANELS WITH CONCAVE SURFACES ON THE SURFACE LAYERS

[76] Inventor: Ian R. McAllister, 2040 West 12th Avenue, Vancouver, B.C., Canada, V6J-2G2

[21] Appl. No.: 436,824

[22] Filed: Nov. 15, 1989

[51] Int. Cl.$^5$ .......................... B32B 1/04; B65D 90/06
[52] U.S. Cl. ...................... 428/167; 428/166; 428/172; 428/161; 428/69; 428/76; 428/57; 428/99; 428/101; 428/432; 428/458; 428/463; 428/215; 428/192; 220/420; 220/424; 220/425; 220/668; 220/660; 206/524.8
[58] Field of Search .............. 428/166, 167, 172, 161, 428/69, 76, 57, 94, 101, 432, 458, 463, 215, 192; 220/420, 424, 425, 84, 668, 660; 206/524.8

[56] References Cited

U.S. PATENT DOCUMENTS

| | | |
|---|---|---|
| 1,337,278 | 4/1920 | Schulz . |
| 2,633,264 | 3/1953 | Dinsmore et al. . |
| 2,643,022 | 6/1953 | Cornell .................. 220/424 |
| 3,370,740 | 2/1968 | Anderson . |
| 3,936,553 | 2/1976 | Rowe .................. 428/69 X |
| 4,317,854 | 3/1982 | Rathmell .................. 428/69 X |
| 4,358,490 | 11/1982 | Naqui .................. 428/69 X |
| 4,646,934 | 3/1987 | McAllister . |
| 4,778,078 | 10/1988 | McAllister .................. 220/420 |

Primary Examiner—Ellis P. Robinson
Assistant Examiner—William P. Watkins, III
Attorney, Agent, or Firm—Dean A. Craine

[57] ABSTRACT

An insulating panel and shapes each having an outer, continuous membrane, an internal rigid frame, and an enclosed vacuum space. The outer continuous membrane is made up of a top membrane and a bottom membrane each having a plurality of biaxially curved, concave surface which are loaded in tension when the top or bottom membranes are exposed to ambient atmospheric pressure. Between each biaxially curved, concave surface is an arcuate path through which differential tension loadings on the adjacent biaxially curved, concave surfaces are offset, thereby reducing the structure requirements on the internal rigid frame. A second embodiment has an expansion joint means, the top or bottom membrane which enable the panel to maintain the tension stress loadings on the top and bottom surfaces when thermal contraction or expansion occurs in the top or bottom membranes, a corner shape, an inside corner shape, and a container embodiment are also disclosed herein.

21 Claims, 8 Drawing Sheets

VACUUM INSULATED PANELS WITH CONCAVE SURFACES ON THE SURFACE LAYERS

TECHNICAL FIELD

The present invention relates to insulating panels or other shapes. More particularly, this invention relates to vacuum insulating panels or shapes used for preserving perishable materials and other goods at optimal storage temperatures.

BACKGROUND ART

Perishable, temperature-sensitive materials and goods must be stored and preserved at optimal storage temperatures. Depending upon the type of perishable materials or goods being preserved, the optimal storage temperature required inside the storage container may be relatively high or low compared to the ambient temperature outside the container. In many instances, the materials or goods must be preserved or stored inside the container for several days during which time the optimal storage temperature must be maintained.

Conventional insulating containers use foam or other types of insulating materials placed between the outer walls of the container and the inside insulated space. The amount of heat that is transferred through these materials is proportional to the material's thermal conductivity, the length of time for exposure, the thickness of the material, and the temperature gradient between the material's inside and outer surface. Since these materials have relatively moderate thermal conductivity properties, the thickness of the material must be increased in order to reduce the amount of heat transfer. In the shipping industry, for example, where shipping space is often limited, the use of thick, bulky insulating material is usually undesirable.

Therefore, insulating panels or shapes that can efficiently maintain optimal storage temperatures for extended time periods and which are compact and occupy minimal space are highly desireable. In addition, insulating panels or shapes which can be used either separately or placed inside a rigid, conventional container are also highly desirable.

In the insulation field, it is known that a container having a vacuum space between its outer and inner surface, can act as an excellent insulator. In order to support the enclosed vacuum space, however, the container must have a strong rigid structure to support the large pressure loads that exist on the container's outer and inner surfaces. In the past, cylindrical-shaped containers having an internal vacuum insulating space have been used for preserving liquid materials and other goods. These containers, typically, have relatively large, outer rigid structures.

McAllister, (U.S. Pat. No. 4,446,934) discloses a large, self-containing, vacuum insulating shipping container having inner and outer wall sections with membranes enclosing two structural support frames. The membranes of the outer wall section curve inwardly and the membranes of the inner wall section curve outwardly with the pressure loads imparted on each set of membranes being transmitted into their respective structural support frame. The structural support frames are separated by supports.

Anderson, (U.S. Pat. No. 3,370,740) discloses a double wall, thermal insulating evacuated panel having an internal support structure which resists collapse of the walls caused by external ambient forces. The support structure comprises a series of post-like supports extending perpendicular from the inner surface of the walls with tension cables extending over the ends of the supports.

Dinsmore, et al., (U.S. Pat. No. 2,633,264,) discloses a double wall thermos unit having an outer and an inner shell with an evacuated space created between the shells with no apparent internal support structure. The evacuated space may contain dead air space or be evacuated or filled with insulating material.

Schultz, (U.S. Pat. No. 1,337,278) discloses a vacuum container having generally a cylindrical shape with outer and inner walls formed of wood or some other rigid material, a vacuum space located between the walls, and supporting strips.

None of these patents disclose a vacuum insulating panel or shape that has the features or methods disclosed herein.

DISCLOSURE OF THE INVENTION

The invention disclosed herein will be described in the context of the shipping or transporting industries. As will be appreciated by those skilled in the art, this invention will likely have application in other types of industries where insulating devices are used.

It is a general object of the invention to provide a vacuum insulating panel or shape that can be used for shipping or transporting perishable, temperature-sensitive materials and other goods at optimal storage temperatures.

It is a general object of the invention to provide a vacuum insulating panel that occupies minimal space.

It is another general object of the invention to provide a vacuum insulating panel or shape that can be used either separately or used inside a rigid container.

It is an object of the invention described below to provide a vacuum insulating panel having planar top and bottom membrane surfaces and a lightweight, rigid frame that provides adequate support to the panel's top and bottom membrane surfaces.

It is a further object of the invention to provide a vacuum insulating panel having top and bottom membrane surfaces that can mutually offset their respective pressure loadings and thereby minimize the amount of structural support needed.

It is a further object of the invention to provide a vacuum insulating panel that can be modified to accommodate different stress loadings and temperatures on the panel's top and bottom membrane surfaces.

It is a still further object of the invention to provide a vacuum insulating panel that can be easily modified and used with other like vacuum insulating panels to manufacture various corner and container insulating shapes having a continuous, enclosed vacuum space and outside and inside membrane surfaces which can offset differential pressure loadings.

These and other objects of the invention, which will become apparent, are accomplished by the apparatus and methods described herein.

This invention comprises vacuum insulating shapes that can efficiently maintain optimal storage temperatures for preserving perishable, temperature-sensitive materials and other goods. In a preferred embodiment, the shape is a flat panel having an outer continuous membrane which encloses an internal rigid frame and a vacuum space. The continuous membrane has a plurality of preformed biaxially curved, concave surfaces and arcuate paths between adjacent biaxially curved, concave surfaces which can effectively offset differential atmospheric loads presented on the panel's adjacent or opposite surfaces. The use of a plurality of biaxially curved, concave surfaces on the panel's outer, continuous membrane and its ability to offset differential pressure loadings significantly reduces the structural requirements on the internal rigid frame. Therefore, the rigid frame used to support the outer continuous membrane is relatively small compared to the rigid frame structures used in conventional vacuum insulated containers.

In a preferred embodiment, the panel has substantially planar top and bottom surfaces, front and rear surfaces, and right and left end surfaces. Each surface of the panel is covered with an outer continuous membrane made of thin, durable material, such as aluminum, having a uniform thickness. In construction, the continuous membrane comprises top and bottom membrane sections which are sealed together at their peripheral edges along a seam located on the panel's side and end surfaces. A low conductive polymer adhesive material, such as a fluoro-carbon film sold by E.I. Dupont de Nemours & Co. or silicon sealant material is used between the edges to properly seal and attach them together.

Enclosed within each panel is an internal, continuous vacuum space and a lightweight, rigid, relatively small cross-sectional frame made of low conductive material, such as fiberglass or an equivalent composite material. The rigid frame comprises two identical frame sections, a top frame section which supports the top membrane section and a bottom frame section which supports the bottom membrane section. Each top and bottom frame section is made of parallel rows of beams and crossmembers which intersect perpendicularly forming a top and bottom planar grid surface, respectively. The outer surface of each beam and cross-member is smooth and round enabling the adjacent membrane surface to move freely. Support columns are formed at the intersection of the beam and cross-member on each grid surface and extend centrally into the panel.

During assembly of the rigid frame structure, the top and bottom grid surfaces are oriented parallel to each other, and the ends of the support columns are aligned and joined together at a column joint. A thermal break having relatively low conductivity properties and a minimal contact surface, such as a bead made of glass or some other suitable material, may be placed inside the column joint between the adjoining support columns ends to reduce conductive heat loss. A planar thermal barrier, made of multiple layers of reflective coated polyester film, may be placed centrally inside the panel substantially parallel to the panel's top and bottom surfaces to further reduce radiation and convection thermal transfer through the panel.

A plurality of preformed, equal size and shape, biaxially curved, concave surfaces are manufactured on the outer continuous membrane. The continuous membrane encloses the internal rigid frame so that each panel surface has a plurality of biaxially curved, concave surfaces. The round, outer surfaces of the individual beam and cross-members that make up each grid surface are manufactured to match the shape of the inside surface of the membrane located between each biaxially curved, concave surface.

During use, the outside surface of the continuous membrane is exposed to ambient atmospheric pressure which loads each individual biaxially curved, concave surface in tension. Adjacent biaxially curved, concave surfaces are joined together over the round supported surface, known as an arcuate path, which distributes the tension stresses on the adjacent biaxially curved, concave surfaces equally and oppositely. By using a plurality of biaxially curved, concave surfaces joined together over arcuate paths, the differential pressure loadings on the panel's membrane on opposite sides of the panel are offset which reduces the structural demands placed on the panel's rigid frame. The rigid frame, therefore, enclosed in each panel is relatively small in cross-section compared to the rigid frames used with known vacuum insulated panels. This, in turn, enables the construction of an vacuum insulated panel, disclosed herein, having a smaller cross-sectional dimension than conventional vacuum insulated panels.

During construction of the preferred embodiment, the size and shape of each biaxially curved, concave surface may be varied. The dimensions of the beams and crossmembers of the rigid frame and the curvature of the biaxially curved, concave surfaces may be adjusted to utilize different materials and different structural loadings.

A second panel embodiment and three insulating shape embodiments are also disclosed having an outer continuous membrane surface and an enclosed vacuum space. In the second panel embodiment, the panel has an expansion joint means manufactured along one panel surface. The expansion joint means comprises an expansion joint arcuate path positioned along the surface which enables the panel to maintain the tensile loadings on the top and bottom membranes when dimensional changes occur in the top and bottom membrane due to thermal contraction or expansion.

In a corner shape embodiment, a first panel, having a structure similar to the first panel embodiment described above, is attached to a second panel. The corner shape has a outer, continuous membrane and enclosed vacuum space. A corner joint means is used between the panels which provides a continuous arcuate path between the two adjoining panel surfaces which enable the surface tensile loadings on the adjoining surfaces to be offset. In addition, the corner joint means enables the tensile stress loadings on each adjoining surface to be maintained when dimensional changes occur on each panel's top and bottom membranes due to thermal contraction or expansion.

In still another shape embodiment, the corner shape embodiment described above is attached to a third panel to make an inside corner shape having a continuous outer membrane surface and an enclosed, continuous vacuum space. The third panel is attached to the corner shape embodiment using a third corner joint means and a female joint member which interconnects the three adjacent corner joint means at the inside corner vertex. Each corner joint means provides an arcuate path between two adjoining panel bottom surfaces which enables the tensile stress loadings on two bottom surfaces to be maintained and offset. Since each bottom surface is joined to an adjacent bottom surface, the tensile stress loading on each surface of the corner shape is offset. The three corner joint means also enable the tensile loadings on the top and bottom membranes on each adjoining panel to be maintained when dimensional changes are made on the top or bottom membranes due to thermal contraction or expansion.

In yet another embodiment, a vacuum insulating container shape is disclosed having a outer, continuous membrane and an enclosed vacuum space. The container shape has four vertical sides surfaces and a horizontal bottom surface, each further comprising one or more panel embodiments. Inside corner shapes are used at each inside corner site to offset the tensile stress loadings on adjacent surfaces.

Other features of the present invention will become apparent from the following detailed description.

BEST MODE FOR CARRYING OUT THE INVENTION

Referring specifically to the drawings wherein like numerals indicate like parts, there is seen in FIGS. 1-7, a rectangular-shaped, vacuum insulating panel 15 used for preserving perishable, temperature-sensitive materials and other goods. Panel 15 may be manufactured in various widths and lengths and in other shapes, and panel 15 may be used for other purposes as will be apparent to those skilled in the art.

Figure 1:
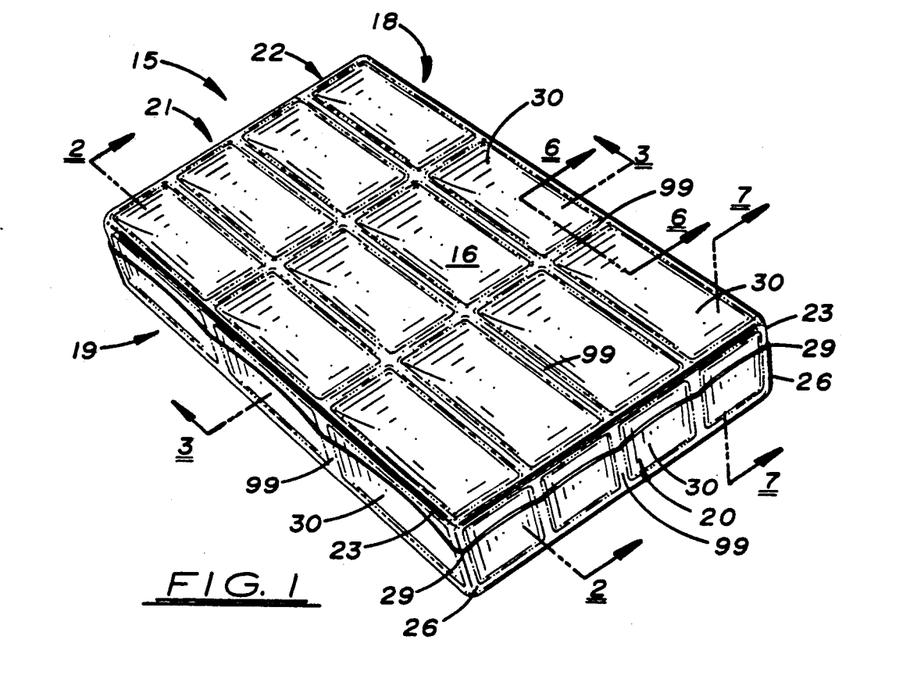
FIG. 1 is a perspective view of one embodiment of the invention.

As shown generally in FIG. 1, panel 15 has a plurality of biaxially curved, concave surfaces 30 located on each planar surface. The biaxially curved, concave surfaces 30 may be manufactured with different dimensions and with different axial and longitudinal curvatures. The biaxially curved, concave surfaces 30, is joined with an adjacent biaxially curved, concave surface over an arcuate path 99. Using a plurality of biaxially curved, concave surfaces 30 joined together over arcuate paths 99 on each planar surface, enables panel 15 to evenly distribute the total pressure loading on each planar surface among the biaxially curved, concave surfaces located on each panel surface. In addition, panel 15 is able to offset equally and oppositely differential pressure loadings on adjacent and opposite planar surfaces.

As shown in FIGS. 1-4, panel 15 has a plurality of substantially planar surfaces, numbered and named for reference purposes as top surface 16, a bottom surface 17, a right side surface 18, a left side surface 19, a front surface 20, and a rear surface 21. In a preferred embodiment, panel 15 measures approximately 8 inches×26 inches×38 inches (H x W x L). Top and bottom surfaces 16 and 17 each have twelve equal size and shape biaxially curved, concave surfaces 30, respectively, each measuring approximately 5 inches×11 inches (W x L) with an approximate 0.67 inch curvature deflection. Right and left surfaces 18 and 19 each have three equal size and shape biaxially curved, concave surfaces 30, each measuring approximately 5 inches×11 inches (W x L) with an approximate 0.67 inch curvature deflection. Front and rear surfaces 20 and 21 each have four equal size and shape biaxially curved, concave surfaces 30, respectively, each measuring 5 inch×5 inch (L x W) with an approximate 0.67 inch curvature deflection. On each panel surface 16–21, the radii of arcuate paths 99 are approximately 1 inch.

Figure 2:
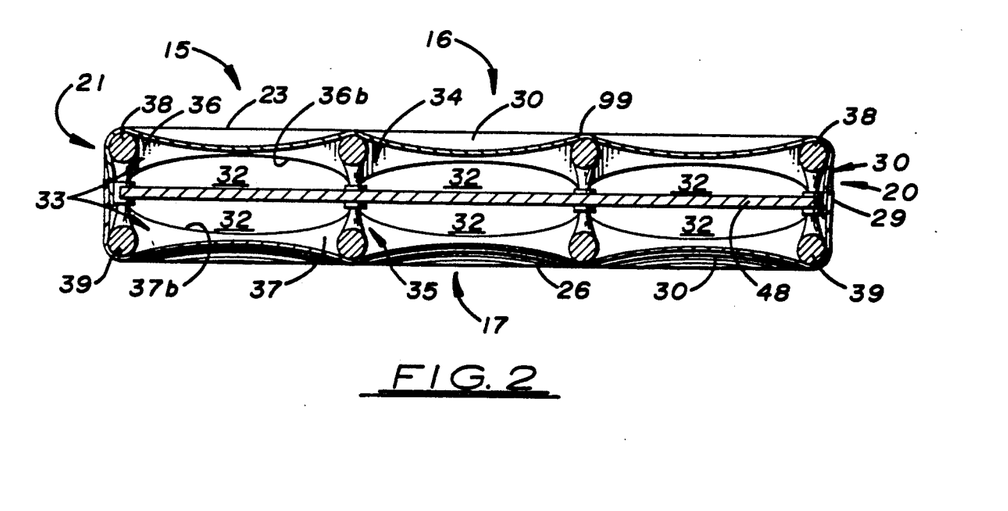
FIG. 2 is a side view, in section, taken along section lines 2—2 of FIG. 1.
Figure 3:
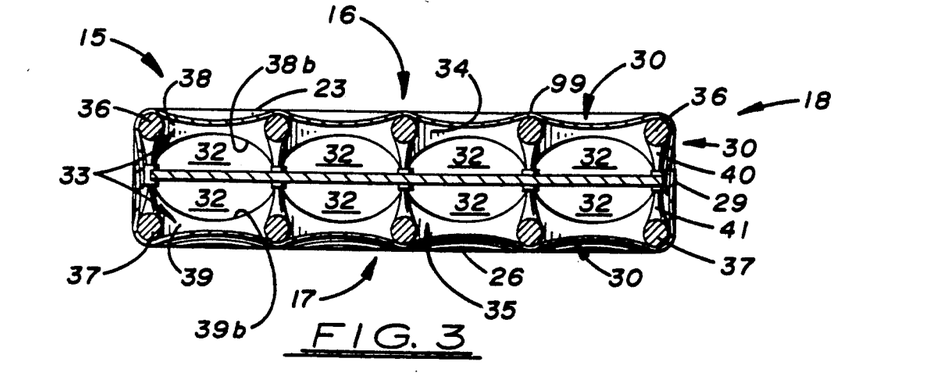
FIG. 3 is a side view, in section, taken along section lines 3—3 of FIG. 1.
Figure 4:
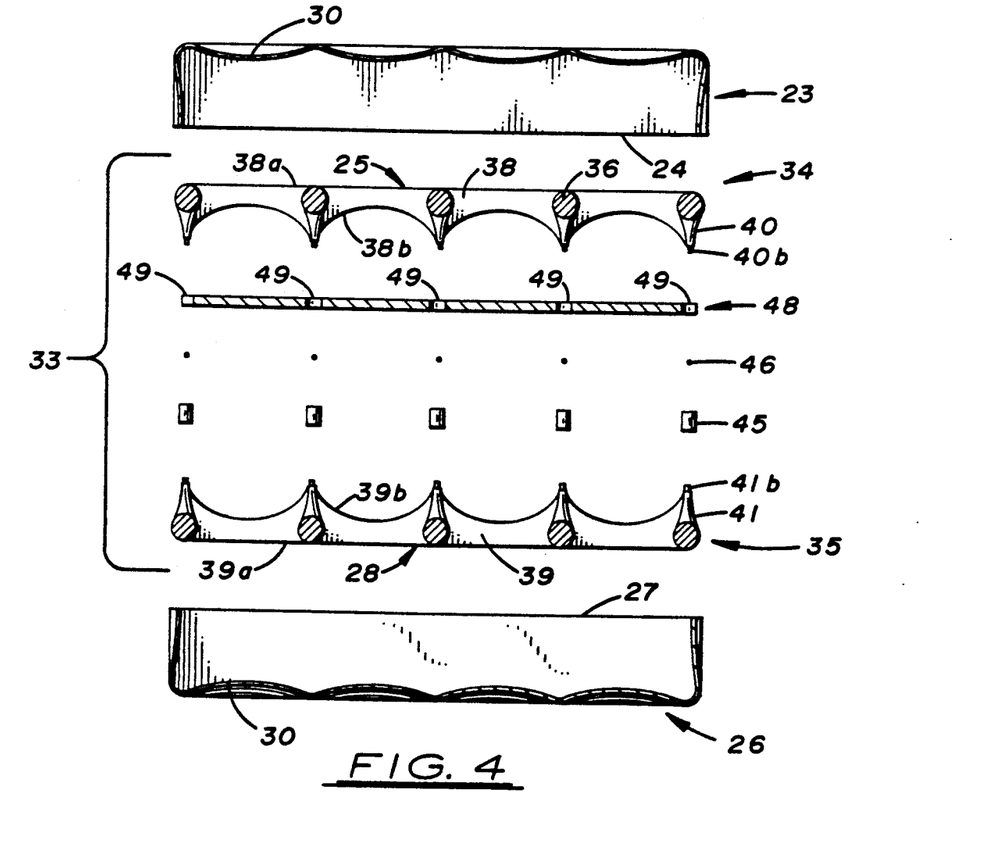
FIG. 4 is a exploded side view, in section, similar to FIG. 3 taken along section lines 3—3 in FIG. 1.

As shown in FIGS. 1-4, panel 15 has an outer continuous membrane 22 comprising a top membrane section 23 and a bottom membrane 26 section both made of strong, durable material, such as aluminum or some other suitable material, having a uniform thickness between 0.020 and 0.100 inches. In FIG. 4, top membrane 23 and bottom membrane 26 are joined together by overlapping their peripheral edges 24 and 27, respectively, and forming a continuous, air-tight seam 29 located on right and left side surfaces 18 and 19 and front and rear surfaces 20 and 21. As seen more clearly in FIG. 7, a sealant 31, such as a fluorocarbon film, manufactured by E.I Dupont de Nemours & Co., or some other suitable sealant material, such as silicon, is placed between the overlapping peripheral edges 24 and 27 to attach and seal the edges 24 and 27 together.

As seen in FIGS. 2-4, outer continuous membrane 22 encloses a lightweight, rigid frame 33 and a continuous vacuum space 32. Rigid frame 33, is made of fiberglass or an equivalent composite material and comprises two identical top and bottom frame sections, 34 and 35, respectively. Top frame section 34 supports the top membrane 23 and comprises parallel rows of beams 36 and cross-members 38 which intersect perpendicularly and form a top grid surface 25. Bottom frame section 35 supports the bottom membrane 26 and comprises parallel rows of beams 37 and cross-members 39 which intersect perpendicularly and form a bottom grid surface 28. The inner longitudinal surface 36(b) and 37(b) of beams 36 and 37, respectively, and the inner longitudinal surface 38(b) and 39(b) of cross-members 38 and 39, respectively, are concave outwardly to reduce weight.

When assembling panel 15, opposite biaxially curved, concave surfaces 30 are positioned between the individual beams and cross-members on the supporting top and bottom grid surfaces 25 and 28. Opposite biaxially curved, concave surfaces on the right and left side surfaces, 18 and 19 and front and rear surfaces, 20 and 21, are positioned between the top and bottom frame sections, 34 and 35.

Also as seen in FIGS. 2-4, rigid frame 33 has a plurality of support columns 40 and 41 integrally attached to the inside surface of the top and bottom frame sections 34 and 35, respectively. Each support column 40 or 41, as shown in greater detail in FIG. 5, extends centrally into the panel 15 substantially perpendicular to the top and bottom grid surfaces, 25 and 28, respectively, from each intersection site of a beam and cross-member. Each column 40 and 41 comprises a cylindrical shank 40(a) and 41(a) and an end surface 40(b) and 41(b), respectively. During assembly of the rigid frame, the top and bottom grid surfaces 25 and 28 are oriented parallel to each other. The support columns 40 and 41 are positioned opposite to each other, aligned, and then joined together at their ends 40(b) and 41(b) at column joint 43. A hollow cylindrical column guide 45 is placed around each joint 43 to align and attach the adjoining column ends together.

Figure 5:
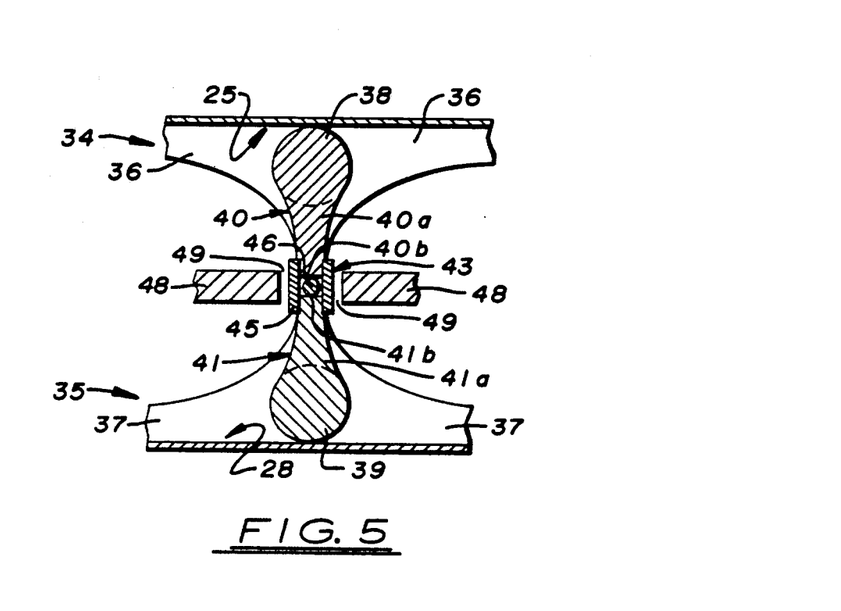
FIG. 5 is a partial side view, in section, showing in greater detail the construction of each support column and the column joint of the embodiment shown in FIG. 1.
Figure 7:
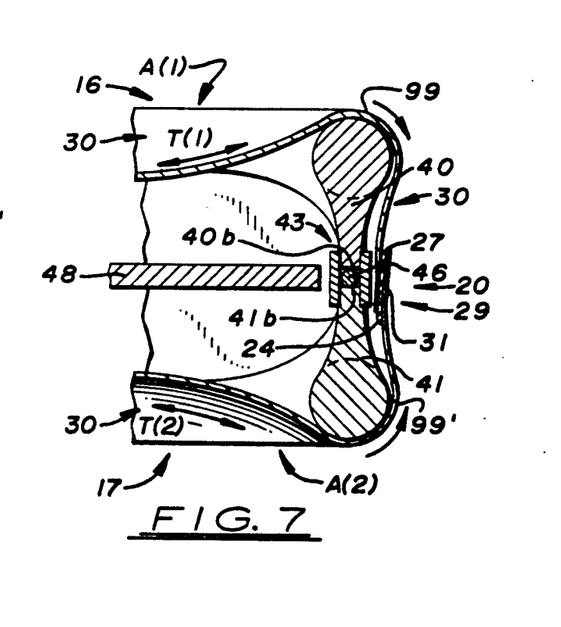
FIG. 7 is a side view, in section, taken along section lines 7—7 of FIG. 1 showing the construction of the front surface of the panel.

FIGS. 5 and 7 show a thermal break and a thermal barrier used inside the panel 15 to reduce heat loss. A thermal break having relatively low thermal conductive properties and minimal contact surface, such as a bead 46 made of glass or some other suitable material, is placed between the adjoining ends 40(b), 41(b) to reduce thermal conduction through the panel 15. A continuous, planar thermal barrier 48, made of multiple layers of reflective coated polyester film, is placed centrally inside the panel substantially parallel to and equal distance from the panel's top and bottom surface 16 and 17, respectively, to reduce radiation and convection thermal transfer through panel 15. A plurality of holes 49 having sufficient diameters are manufactured in the thermal barrier 48 to enable support columns 40 and 41 to be joined together.

During use, ambient atmospheric pressures are presented on adjacent or opposite panel surfaces and the biaxially curved, concave surfaces located on each surface are loaded primarily in tension. The arcuate paths 99 between contiguous biaxially curved, concave surfaces transmit the tension stresses found on each biaxially curved, concave surface 30 equally and oppositely to an adjacent biaxially curved, concave surface. In this manner, the tension stresses found on the biaxially curved, concave surfaces 30 located on the top membranes 23 are offset equally and oppositely with the biaxially curved, concave surfaces located on the bottom membrane 26. By sharing the tensile loads of the biaxially curved, concave surfaces through arcuate paths, the tensile loads are offset resulting in a reduction of the total structural demand on the rigid frame. The remaining forces are small and essentially compressive and are easy handle by the beams, cross-members, columns of the rigid frame.

Figure 6:
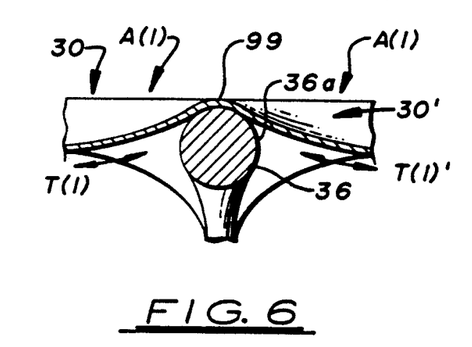
FIG. 6 is a side view, in section, taken along lines 6—6 of FIG. 1 showing two adjacent biaxially curved, concave surfaces joined together over an arcuate path.

The ability of adjacent biaxially curved, concave surfaces to mutually offset their respective tension loadings is shown in FIG. 6 where two adjacent biaxially curved, concave surfaces 30 and 30' are supported by beam 36 and are exposed to atmospheric pressure A(1) and loaded in tension T(1), T(1)', respectively Concave surfaces 30 and 30' are joined together over an arcuate path 99 through which their respective tension stress loadings, T(1) and T(1)' are offset. The outer contact surface 36(a) of beam 36 and cross-member (not shown) is smooth and round and matches the shape of the inside surface of arcuate path 99. The section of membrane adjacent to arcuate path 99 is freely supported by a beam 36 or cross-member (not shown) and therefore, able to move and adjust to minor differential tensile loadings.

FIG. 7 is a partial side view, in section, of front surface 20 and top and bottom surface 16 and 17 showing how the tensile stress on opposite panel surfaces are transferred to an adjacent surface and offset. The biaxially curved, concave surfaces 30 located on the top surface 16 and bottom surface 17, are exposed to atmospheric pressures A(1), A(2)' which loads each biaxially curved, concave surface essentially in tension T(1) and T(2)', respectively. The biaxially curved, concave surface 30 is located on front surface 20 with arcuate paths 99 and 99' disposed between the biaxially curved, concave surfaces located on top surface 16 and bottom surface 17. During use, tensile forces T(1) and T(2) are transferred over arcuate paths 99 and 99', respectively, and into the biaxially curved, concave surface 30 located on front surface 20, where they are offset.

The actual tension developed on each biaxially curved, concave surface 30 is a function of its external dimensions and its axial and longitudinal curvatures. By selecting the appropriate curvatures, the external dimensions of each biaxially curved, concave surface 30 may be changed without changing the biaxially curved, concave surface's tensile loading.

The overall dimensions and shape of the panel 15 may also be varied by adjusting the size of the individual biaxially curved, concave surfaces, the number of biaxially curved, concave surfaces on each panel surface, the dimensions of the beams and cross-members of the top and bottom frame sections, and the radius of the arcuate paths.

Figure 8:
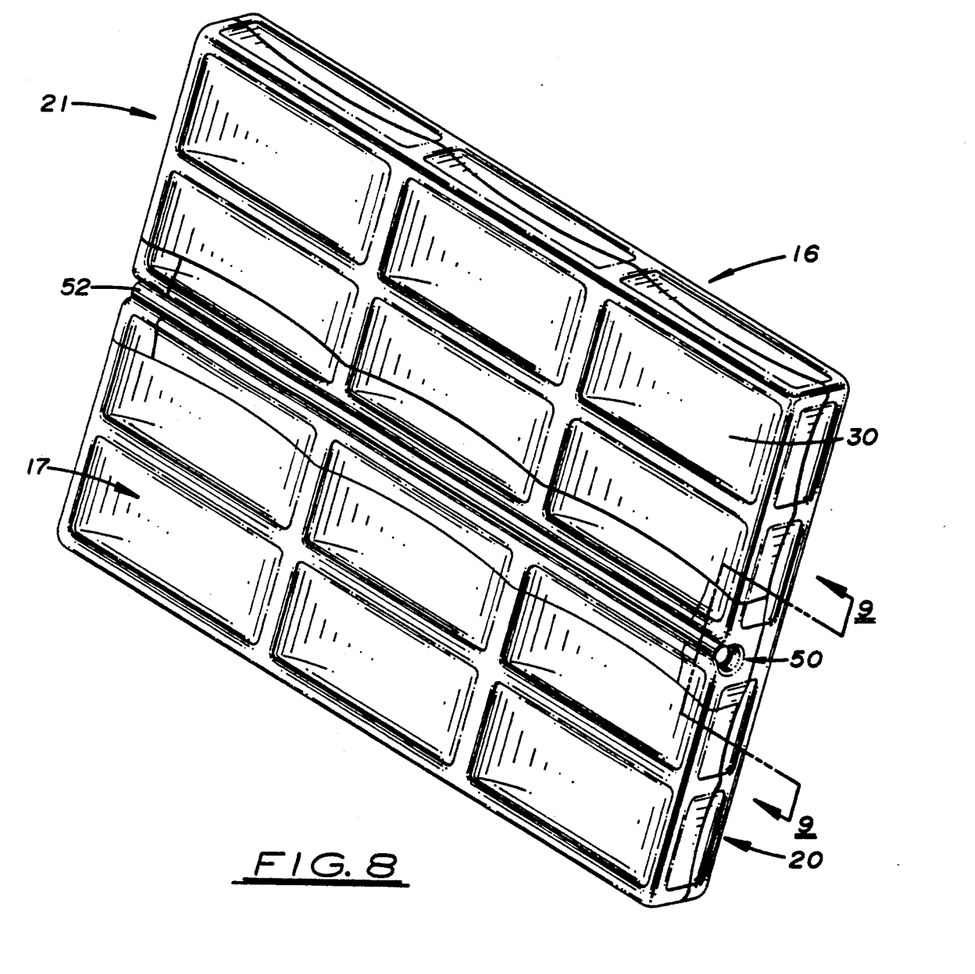
FIG. 8 is a perspective view of an alternative embodiment of the panel shown in FIGS. 1-7 having an expansion joint located longitudinally along the panel's bottom surface.
Figure 9:
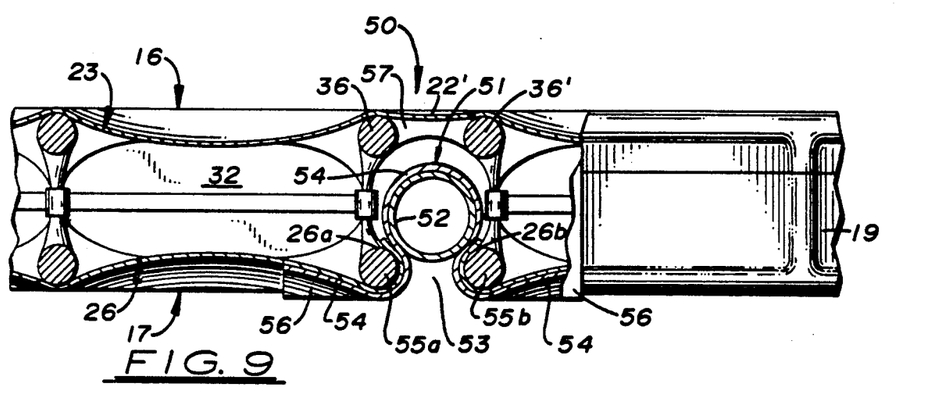
FIG. 9 is a side view, in section, taken along section lines 9—9 of FIG. 8 showing the expansion joint means between two adjacent biaxially curved, concave surfaces located on the bottom membrane of the panel.

In another embodiment, panel 15 may be manufactured with an expansion joint means 50 manufactured either longitudinally (shown) or transversely across one surface. FIGS. 8 and 9 show expansion joint means 50 extending longitudinally across bottom surface 17. The purpose of expansion joint means 50 is to provide a continuous expansion joint arcuate path 51 on a surface of the panel 15 which will maintain the tensile forces on adjacent biaxially curved, concave surfaces when dimensional changes are made in the top 16 or bottom 17 membranes due to thermal contraction or expansion.

As shown in FIG. 9, in construction, expansion joint means 50 comprises an elongated cylinder body 52, an expansion joint inner membrane 54, two expansion joint rigid frame members 55a, 55b, and two expansion joint end membranes 56. An expansion joint gap 53 is created between rigid frame members 55a and 55b. Cylinder body 52, made of aluminum or some other suitable material, has a sufficient length to extend across the bottom surface 17. The expansion joint inner membrane 54 and expansion joint end membrane 56 are made of the same material used to make the continuous membrane 22.

Figure 10:
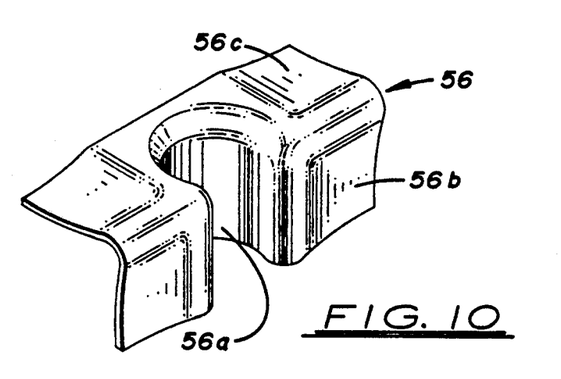
FIG. 10 is a isometric view of the expansion joint end membrane that fits over the expansion joint shown in FIGS. 8 and 9.

The expansion joint end membrane 56, shown more clearly in FIG. 10, has a central cylindrical portion 56(a) which, during assembly of the expansion joint means 50, engages one end of cylindrical body 52 and two adjacent, substantially flat, perpendicular sections 56(b) and 56(c) which, during assembly, are attached and sealed to end surfaces, 20 and 21. End membranes 56 are attached and sealed to panel 15 a similar manner as top membrane 23 and bottom membrane 26 are attached and sealed.

During manufacture of the expansion joint means 50, a plurality of short cross members 57 are located in top frame section 34 between beams 36 and 36' and opposite rigid frame members 55a and 55b. Section 22' of top membrane 22 located opposite rigid frame members 55a and 55b may be flat or manufactured with a plurality of smaller biaxially curved, concave surfaces A cylinder body 52 is disposed through the cylindrical portion 56(a) of each end membrane 56 and placed inside the central portion of expansion joint means 50. Bottom membrane section 26 terminates at ends 26a and 26b on opposite sides of expansion joint 50. Each edge 26a and 26b is looped around an adjacent rigid member 55a or 55b and attached and sealed to one edge of expansion joint inner membrane 54. The central portion of the expansion joint inner membrane 54 is then positioned inside the panel 15 and placed around cylinder body 52 compressing it against rigid members 55a and 55b.

When top surface 16 and bottom surface 17 are exposed to different ambient temperatures, thermal contraction and expansion in the top membrane 23 and bottom membrane 26, respectively, may occur which changes the tensile forces on the biaxially curved, concave surfaces located on top membrane 23 and bottom membrane 26. Expansion joint means 50 provides an arcuate path 51 through which the resultant tensile forces on biaxially curved, concave surfaces located on each side of expansion joint means 50 may be maintained. When, for example, the bottom membrane 26 is exposed to a lower temperature than top membrane 23, the dimension of the bottom membrane 26 will be reduced due to thermal contraction causing the expansion joint inner membrane 54 to compress against the cylindrical body 52. This, in turn, forces cylindrical body 52 against rigid frame members 55a and 55b causing expansion joint gap 53 to widen. The widening of gap 53 enables cylinder body 52 to move towards bottom surface 17 which reduces the length of arcuate path 51. By adjusting the length of the arcuate path 51 in this manner, the tensile loadings on adjacent biaxially curved concave surfaces located on each side of expansion joint means 50 may be maintained when the top and bottom surfaces are exposed to different temperatures.

Figure 11:
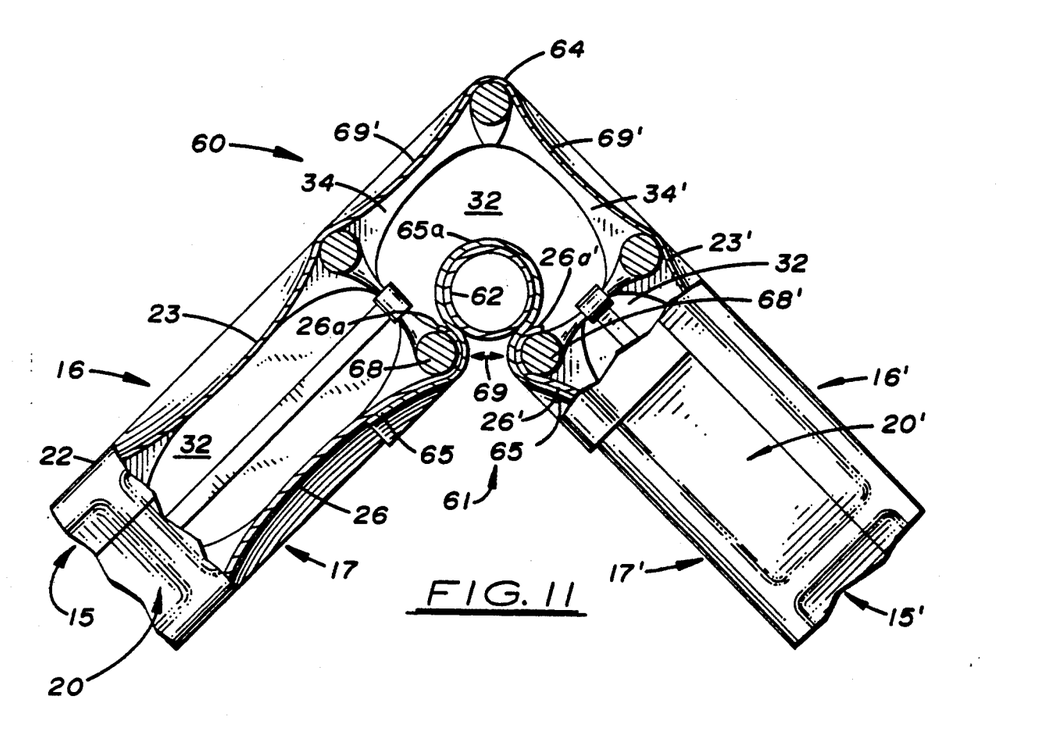
FIG. 11 is a plan view, partially in section, showing a corner shape embodiment of the invention comprising two panels joined together perpendicularly using a corner joint means.

In another embodiment, shown in FIG. 11, a first and second panel 15 and 15' are joined together using a corner shape means 61 to manufacture a corner shape 60 having a outer continuous membrane 22 and a continuous vacuum space 32. Corner joint means 61 functions similar to expansion joint means 50 by providing a continuous arcuate path 63 between bottom surfaces 17 and 17' located on said first and second panels 15 and 15', respectively.

Figure 12:
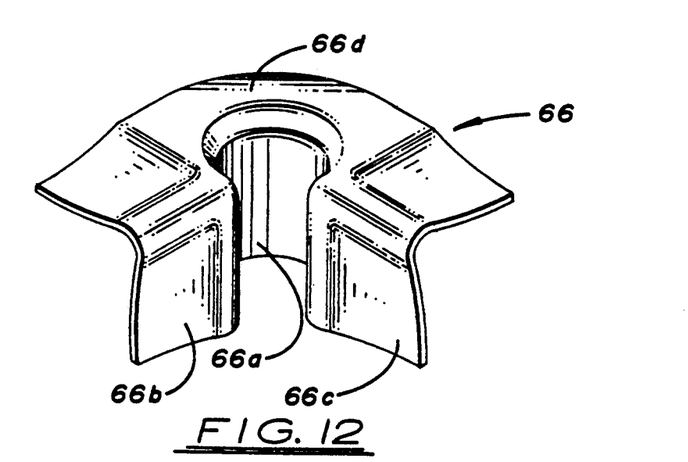
FIG. 12 is a isometric view of a corner joint end membrane that fits over the corner joint means shown in FIG. 11.

Corner joint means 61 comprises an elongated cylinder body 62, a corner joint membrane 65, and two corner joint end membranes 66. FIG. 12 shows corner end membrane 66 having a central cylindrical portion 66a, two substantially flat perpendicular bottom membrane portions 66(b) and 66(c), and a substantially flat outer round end membrane portion 66(d). Corner joint membrane 65 and the corner joint end membranes 66 are made of the same material as continuous membrane 22.

During manufacture of the corner shape 60, top frame sections 34 and 34' are joined together perpendicularly at outer rigid member 67 located opposite to corner joint means 61. Continuous outside membrane 22 comprising top membrane section 23 and a bottom membrane section 26 each having a plurality of biaxially curved, concave surfaces encloses first and second panels 15 and 15' and corner joint means 61. A plurality of smaller biaxially curved, concave surfaces 69 and 69' are manufactured on the two sections of continuous membrane 22 adjacent to outer rigid member 67 and along top membrane surfaces 23 and 23'. Cylindrical body 62 is placed longitudinally across corner joint means 61 inside vacuum space 32 and adjacent to inner corner joint rigid members 68 and 68'. Each end of cylindrical body 62 engages the central cylindrical portion 66a located on corner end membranes 66.

The bottom membranes 26 and 26' located on panels 15 and 15', respectively, terminate at edges 26a and 26a', respectively. Edges 26a and 26b are looped around inner corner joint rigid member 64 and 64'. Corner joint inner membrane 65 has two peripheral edges 65(a) and 65(b) each being attached and sealed to edges 26a and 26a' of membranes 26 and 26', respectively. The central portion 65a of corner joint inner membrane 65 is positioned inside vacuum space 32 and between inner corner joint rigid members 68 and 68' and looped around elongated cylinder body 62. Corner joint end membranes 66 are attached and sealed to the end surfaces 20 and 21 to maintain the continuous vacuum 68.

When exposed to atmospheric pressure, corner joint means 61 operates in the same manner as expansion joint means 51 by providing an arcuate path 63 between adjacent bottom surfaces 17 and 17' located on first and second panels 15 and 15'. When thermal expansion or contraction occurs on top membranes 16 and 16 or bottom membranes 17, 17', the length of arcuate path 63 is increased or decreased which narrows or widens corner joint gap 69. In this manner, the tensile stress loadings on the adjacent bottom membranes 26 and 26' are maintained.

Figure 13:
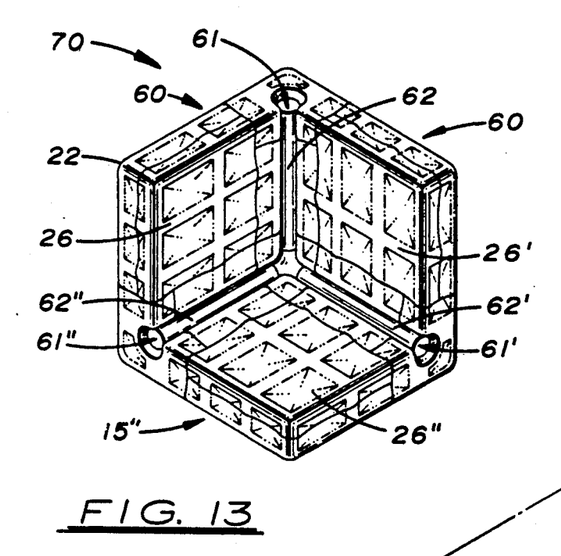
FIG. 13 is a perspective view of an inside corner shape embodiment of the invention.
Figure 14:
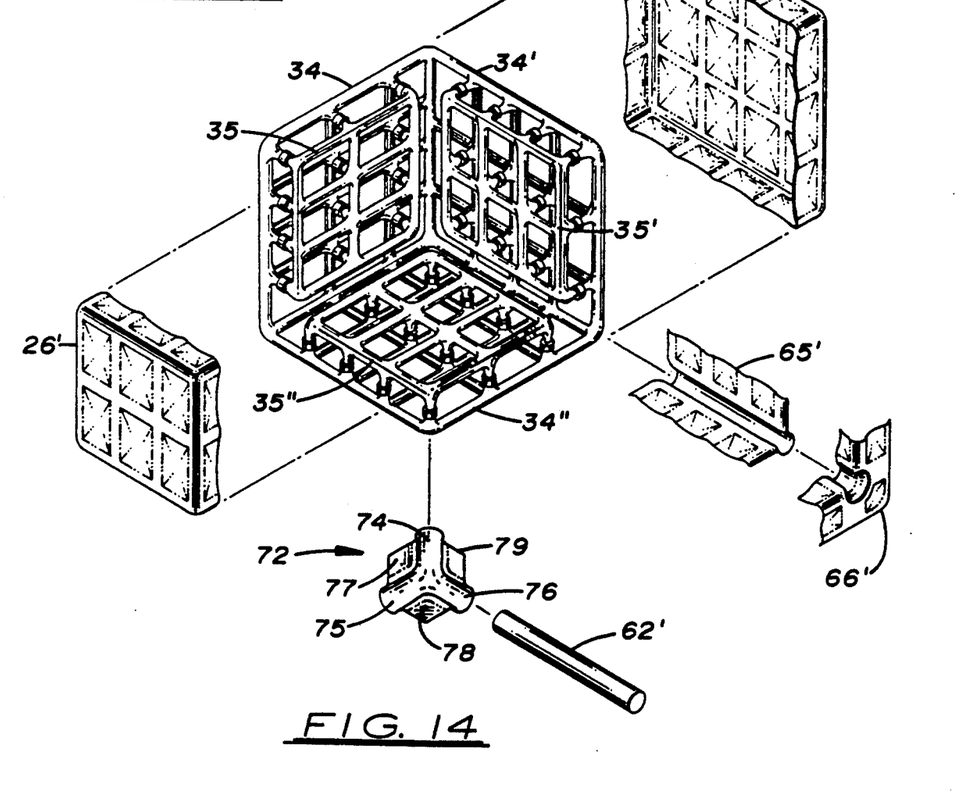
FIG. 14 is an exploded perspective view of the embodiment shown in FIG. 13 showing the internal rigid frames of the three panels joined together to make the internal rigid frame structure of the inside corner shape with a female joint connector being positioned at the vertex of the inside corner.

In another embodiment, shown in FIGS. 13 and 14, a third panel 15" is attached to corner shape 60 forming an inside corner shape 70 having an outer continuous membrane 22 and a continuous vacuum space (not shown). Bottom membranes 26, 26', and 26", of panels 15, 15', and 15", respectively, are joined to an adjacent bottom membrane 26, 26', and 26" by a corner joint means 61, 61', and 61". A female corner joint connector 71 is used at the vertex of the inside corner shape 70 to axially align and interconnect the corner joint means 61, 61' and 61". Corner joint means 61 is used between adjoining panels 15 and 15", corner joint means 61' is used between adjoining panels 15' and 15", and corner joint means 61" is used between adjoining panel 15" and 15' which all provide arcuate paths between the adjoining surfaces. adjoining bottom surfaces 26, 26' and 26".

As shown in FIG. 14, the top frame sections 34, 34', and 34" are joined together to make an internal rigid frame structure. A female joint member 72 made of similar material as the continuous membrane 22 is positioned at the vertex of the adjoining bottom frame sections 35, 35' and 35". Female joint member 72, has three cylindrical body guides, 74, 75, and 76 which are oriented along the longitudinal axis of each corner joint means 61, 61', and 61", and three membrane surfaces 77, 78, and 79 which attach to the bottom membranes (only bottom membrane 26' shown) and corner joint inner membranes (only corner joint inner membrane 65 shown).

As described above with corner joint 60, the bottom membrane 26, 26' and 26" of each panel 15, 15' and 15", respectively, are attached to the inner membranes of corner joints 60, 60' and 60". A cylindrical body 52 is then placed into each corner joint and interconnected with a cylindrical body guide located on the female joint member 72. Each corner joint end membrane 66 is then attached and sealed to each open end surface of each corner joint to maintain the continuous vacuum space as described with corner shape 60. In this manner, the tensile stress on adjacent biaxially curved, concave surfaces located on the three adjoining bottom membranes are maintained.

Figure 15:
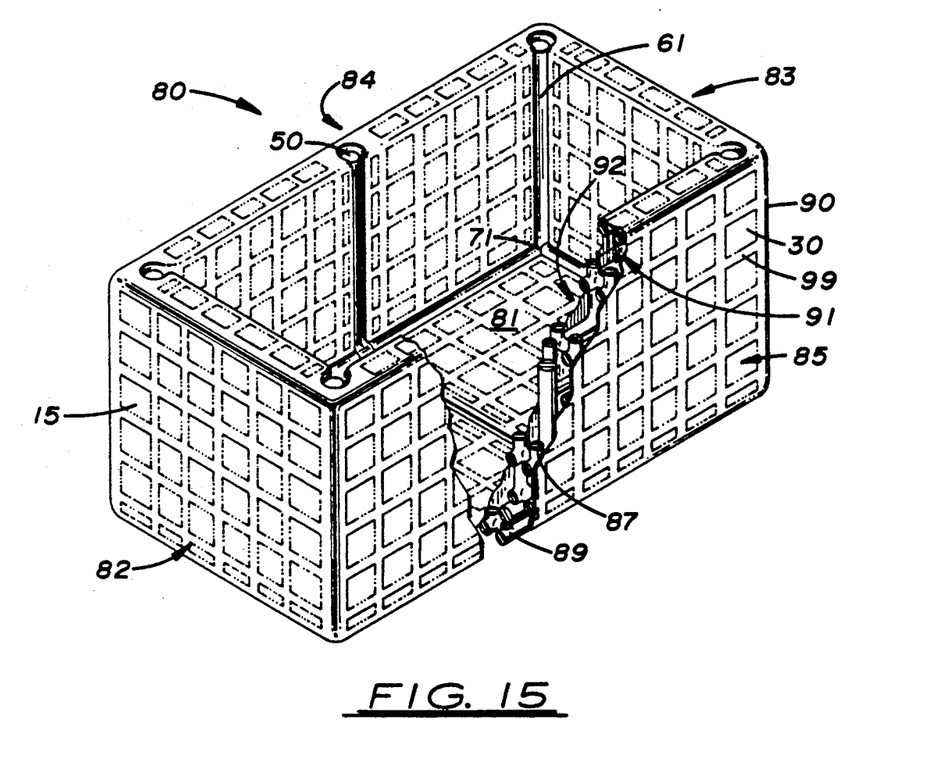
FIG. 15 is a perspective view, partially in section, showing a container shape embodiment of the invention having an outer, continuous membrane and an enclosed vacuum space.

A container embodiment 80 of the invention is shown in FIG. 15 having a bottom surface 81, two end surfaces 82 and 83, and two side surfaces 84 and 85. Each surface 81–85 further comprises at least one panel 15, joined together using a corner joints means 61 and female joint members 71. Expansion joint means 50 may be manufactured along the sides of the container 80 for thermal contraction and expansion of the outer continuous membrane 90.

Outer continuous membrane 90 which forms an outer container membrane surface 91 and an inner container membrane surface 92. Each outer and inner container surface 91 and 92 has a plurality of biaxially curved, concave surfaces 30 which are loaded in tension when exposed to ambient atmospheric pressure. Between each biaxially curved concave surface 30 on each surface 91 and 92 are arcuate paths 99 through which differential tension stress loadings on adjacent biaxially curved, concave surfaces may be offset. Enclosed by outer continuous membrane 90 is an internal rigid frame 89 which supports the each outer and inner container surface 91 and 92. A continuous vacuum space 87 is enclosed within container 80.

In compliance with the statute, the invention has been described in language more or less specific as to structural features. It is to be understood, however, that the invention is not limited to the specific features shown since the means of construction herein disclosed describes a preferred form of putting the invention into practice. The invention is therefore claimed in any of its forms or modifications within the legitimate and valid scope of the appended claims properly interpreted in accordance with the doctrine of equivalents.

INDUSTRIAL APPLICABILITY

Vacuum insulating panels and shapes will find wide spread use in the those industries where preserving perishable, temperature-sensitive materials and other goods is desired. The vacuum insulating panels and shapes disclosed herein will be especially useful in the those industries, such as the shipping or cargo industries, to name a few, where perishable, temperature-sensitive materials and other goods must be keep efficiently at optimal temperatures for sustained time periods.

I claim:

1. A vacuum insulating panel, comprising:
 (a) a top membrane section and a bottom membrane section, each said top membrane section and said bottom membrane section having a peripheral edge, said top membrane section and said bottom membrane section being attached and vacuum-sealed together forming an internal vacuum space;
 (b) a plurality of biaxially curved, concave surfaces formed on said top and bottom membrane sections, each said biaxially curved concave surface being located on each said top and bottom membrane section so that each said biaxially curved, concave surface is loaded in tension when exposed to ambient atmospheric pressure;
 (c) an internal rigid frame, said rigid frame being located inside said panel, said rigid frame having a top grid surface which supports said top membrane section and a bottom grid surface which support said bottom membrane surface, each said top and bottom grid surface having a substantially round support surface and;
 (d) a plurality of arcuate paths located on each said top and bottom membrane surface between adjacent said biaxially curved, concave surfaces, each said arcuate path including a rounded membrane portion supported by said round support surface.

2. An insulating panel, comprising:
 (a) an outer, continuous membrane forming a top surface and a bottom surface on said panel;
 (b) an internal rigid frame enclosed within said continuous membrane, said rigid frame supporting said top surface and said bottom surface of said panel;
 (c) a vacuum space enclosed within said continuous membrane;
 (d) a plurality of biaxially curved, concave surfaces formed on said continuous membrane and located on said top surface and said bottom surface of said panel, each said biaxially curved, concave surface being freely supported by said rigid frame and being loaded in tension when exposed to ambient atmospheric pressure, each said biaxially curved, concave surface having selected dimensions, and transverse and longitudinal curvatures such that the developed tensile stresses on adjacent said biaxially curved, concave surfaces are substantially equal, and;
 (e) a plurality of arcuate paths formed on said continuous membrane between adjacent said biaxially curved, concave surfaces, whereby differential tensile stresses on adjacent said biaxially curved concave surfaces may be offset.

3. An insulating panel according to claim 2, wherein said continuous membrane includes a top membrane section and a bottom membrane section, said top membrane section and said bottom membrane section each having a peripheral edge, said top membrane section and said bottom membrane section being attached and sealed together along said peripheral edges.

4. An insulating panel according to claim 3, wherein said top membrane section and said bottom membrane sections are made of aluminum.

5. An insulating panel according to claim 4, wherein said top membrane section and said bottom membrane section are attached and sealed together with a fluoro-carbon film.

6. An insulating panel according to claim 5, wherein said top membrane section and said bottom membrane section each have a uniform thickness between 0.020 inches and 0.100 inches.

7. An insulating panel according to claim 3, wherein said rigid frame includes:
 (a) a top frame section, said top frame section having a plurality of beams and cross-membranes and top frame column members, each said beam and said cross-membrane on said top frame section intersect perpendicularly, said beams and cross-members on said top frame section being oriented in the same plane to form a substantially planar top grid surface which supports said top membrane section, each said beam and said cross-membrane having a rounded shape complementary to adjacent said arcuate path, each said top frame column member extending centrally and substantially perpendicular from said top grid surface, each said top column member having an extended end surface;

(b) a bottom frame section, said bottom frame section having a plurality of beams and cross-members and bottom frame column members, each said beam and cross-members on said bottom frame intersecting perpendicularly and oriented in the same plane to form a substantially planar bottom grid surface which supports said bottom membrane section, each said beam and cross-member on said bottom frame section having a rounded shape complementary to adjacent said arcuate path, each said bottom frame column member extending centrally and substantially perpendicular from said bottom grid surface, each said bottom column member having an extended end surface, and;

(c) said top frame section and said bottom frame section being interconnected by placing said top grid surface and said bottom grid surface parallel and by registering and attaching said extended ends of said top and bottom frame column members together at a column joint.

8. An insulating panel according to claim 7, further comprising:

a cylinder column guide located at each said column joint, said column guide having a hollow passageway through which said extending ends of said top and bottom column members are connected together.

9. An insulating panel according to claim 8, wherein said rigid frame and said column guide are made of fiberglass composite material.

10. An insulating panel according to claim 8, further comprising:

a thermal break located between said extended ends of two adjoining said top and bottom frame column members, whereby terminal conduction between said top and bottom frame column members is reduced.

11. An insulating panel according to claim 10, wherein said thermal break is a bead made of low thermal conductivity material.

12. An insulating panel according to claim 11, wherein said bead is made of glass.

13. An insulating panel according to claim 7, further comprising:

a thermal barrier located inside said vacuum space and positioned substantially midway between said top grid surface and said bottom grid surface, whereby thermal conduction through said panel is reduced.

14. An insulating panel according to claim 13, wherein said thermal barrier is made of multiple layers of a reflective coated polyester film.

15. An insulating panel according to claim 7, further comprising:

an expansion joint means extending transversely or longitudinally across said top or bottom surface of said panel and used to maintain the tensile force on each said biaxially curved, concave surface when dimensional changes are made on said top or said bottom membrane sections of said panel.

16. An insulating panel according to claim 15, wherein said expansion joint means includes an expansion joint arcuate path, said expansion joint arcuate path further including:

(a) two expansion joint rigid frame membranes, each said expansion joint rigid frame member being attached to said top or bottom frame section rigid frame most proximate to said to expansion joint arcuate path, said expansion joint rigid frame members being place parallel and longitudinally aligned with said expansion joint arcuate path, an expansion joint gap is created between said expansion joint rigid frame members;

(b) an expansion joint members, said expansion joint inner membrane having two peripheral edges and a central portion, each said peripheral edge being attached and sealed to said bottom membrane section adjacent to said expansion joint arcuate path, said expansion joint inner membrane being attached and sealed to said bottom membrane section making said bottom membrane section continuous, said central portion of said expansion joint inner membrane being through said expansion joint gap and placed inside said panel;

(c) an expansion joint end membrane, each said expansion joint and membrane being attached and sealed to said expansion joint inner membrane and said top and bottom membrane sections so that said internal vacuum space is maintained;

(d) an elongated cylindrical body, said cylindrical body having a length sufficient to extend a cross said expansion joint, said cylindrical body being positioned inside said panel and between said expansion joint rigid frame members, said central portion of said expansion joint inner membrane being wrapped partially around said cylindrical body and compressing said cylindrical body against the outer surfaces of said expansion joint rigid frame members;

(e) said expansion joint gap between said expansion joint rigid frame members, said expansion joint gap distance may be varied by changing the compression force made by said cylindrical body against the outer surface of said expansion joint rigid frame members;

(f) whereby when dimensional changes occurs on said top or bottom membrane section, said expansion joint inner membrane variably compresses said cylindrical body against said expansion joint rigid frame which increases or decreases the size of said expansion joint gap and thereby, maintains the tension force on said biaxially curved, concave surfaces.

17. An insulating panel according to claim 7, wherein said panel is a first panel attached to a second panel forming a corner shape using a corner joint means between said first and second panels, said corner shape having an outer continuous membrane and a continuous vacuum space, said corner joint means being placed between adjacent said bottom surfaces of said first and second panels, said corner joint means being used to maintain the tensile stress loadings on each adjacent said bottom surface when dimensional changes are made on the said top and bottom membrane section on said first and second panel.

18. An insulating panel according to claim 17, wherein said corner joint means comprises:
(a) a corner joint membrane, two corner joint end membranes, a cylindrical body, said corner membrane having a length sufficient to transverse said bottom surface at said corner joint, said corner membrane having opposite peripheral edges, each said peripheral edge being attached and sealed between adjacent said biaxially curved, concave surfaces located on said panel and said second panel;
(b) a cylindrical body, said cylindrical body having two opposite ends and a length sufficient to extend across said corner joint, said cylindrical body being positioned inside said corner shape, said corner membrane being looped around said cylindrical body and restraining said cylindrical body against said rigid frame;
(c) two corner end membranes, each said corner end membrane being attached and sealed to said bottom membrane and adjacent shape surfaces such that said vacuum space inside said corner shape is maintained, each said corner end membrane having a cylindrical portion which engages one said opposite end of said cylindrical body, and;
(d) whereby tensile forces on said biaxially curved, concave surfaces located on opposite sides of said arcuate path corner joint are maintained when dimensional changes occur on said bottom membrane section due to thermal contraction and expansion.

19. An insulating panel according to claim 18, wherein said corner shape is attached to a third said panel forming an inside corner shape having an outer continuous membrane and a continuous vacuum space, said inside corner shape having three planar inside surfaces joined at a common vertex formed by attaching one said corner joint means between said panel and said second panel of said corner shape and the adjoining surface of said third panel, a female joint connector is used at the vertex of the adjoining said bottom frame sections to interconnect said adjacent corner joint means and to maintain the tensile stress loadings on each adjoining said bottom membrane when dimensional changes are made on said top or bottom membrane on said corner shape or said third panel.

20. An insulating panel according to claim 19, wherein said female joint connector comprises three axially aligned female connector guides joined at a common vertex, each female guide connector being formed to interconnect with adjacent said cylindrical body of said corner joint means, each female joint connector being placed at the vertex of said inside corner shape and used to maintain said inside corner shape form and interengage said three cylindrical bodies.

21. An insulating panel, according to claim 2 wherein said panel is used in combination with plurality of other said panels and used to make an insulation container, said container comprising:
(a) a plurality of vacuum insulating panel connected together to form said container having two end surfaces, two side surfaces, and a bottom surface, said container having an outer, continuous membrane surface forming a outer container surface and an inner container surface;
(b) each said end, side, and bottom surfaces having at least one said panel, each said panel being attached to an adjoining said panels located on adjacent said end, side or bottom surface said corner joint means.

* * * * *